United States Patent

Hirschmann et al.

[11] Patent Number: 5,209,060
[45] Date of Patent: May 11, 1993

[54] METHOD FOR THE CONTINUOUS LAMBDA CONTROL OF AN INTERNAL COMBUSTION ENGINE HAVING A CATALYZER

[75] Inventors: Klaus Hirschmann, Leonberg; Lothar Raff, Remseck; Eberhard Schnaibel, Hemmingen, all of Fed. Rep. of Germany

[73] Assignee: Robert Bosch GmbH, Stuttgart, Fed. Rep. of Germany

[21] Appl. No.: 738,621

[22] Filed: Jul. 31, 1991

[30] Foreign Application Priority Data

Jul. 31, 1990 [DE] Fed. Rep. of Germany ....... 4024212

[51] Int. Cl.$^5$ ............................................... F01N 3/20
[52] U.S. Cl. ..................................... 60/274; 60/274; 60/277; 60/285
[58] Field of Search .............. 60/274, 276, 277, 285; 123/440, 489

[56] References Cited

U.S. PATENT DOCUMENTS

| 4,142,482 | 3/1979 | Asano | 60/276 |
| 4,173,952 | 11/1979 | Asano | 60/276 |
| 4,178,883 | 12/1979 | Herth | 60/276 |
| 4,214,563 | 7/1980 | Hosaka | 123/437 |
| 4,402,291 | 9/1983 | Aono | 123/440 |
| 5,070,692 | 12/1991 | Nada | 60/276 |
| 5,172,320 | 12/1992 | Nada | 60/285 |

Primary Examiner—Ira S. Lazarus
Assistant Examiner—L. Heyman
Attorney, Agent, or Firm—Walter Ottesen

[57] ABSTRACT

The invention relates to a method for the continuous lambda control of an internal combustion engine 13 having a catalyzer. The method is carried out by generating a control oscillation FS of pregiven amplitude at least in pregiven operating conditions. This method is based on the recognition that with an increase in amplitude of the control oscillation, the conversion window becomes wider insofar as a maximum amplitude is not exceeded. The conversion window is that range of lambda values wherein the conversion exhibits at least a pregiven quality.

4 Claims, 1 Drawing Sheet 5,209,060

METHOD FOR THE CONTINUOUS LAMBDA CONTROL OF AN INTERNAL COMBUSTION ENGINE HAVING A CATALYZER

FIELD OF THE INVENTION

The invention relates to a method for the continuous lambda control of an internal combustion engine having a catalyzer. Such methods were developed intensely in recent years since they permit the control of low amplitudes of the control oscillation to be carried out but nonetheless enable a rapid compensating performance to be obtained in the presence of disturbances. Furthermore, any desired operating point can be controlled to.

BACKGROUND OF THE INVENTION

Lambda controls were first configured as two-step controls since the lambda probe utilized therein has an sharp non-linear step response approximately about the lambda value one. However, in recent years, probes have been developed to the point where they can be utilized and have a relatively constant measurement accuracy for the lambda value in a larger range about the value one. In this way, it has become possible to control even so-called lean engines or to undertake the control of engines with rich operation such as during warm-up or at full load.

A further advantage of continuous lambda control is that notwithstanding the relatively large dead time, they can be provided in a lambda control circuit with a D-component (derivative component). This enables such controls to react very rapidly to changes of the lambda value as they occur during transient operation of the controlled engine. Notwithstanding the rapid response, the continuous control can always control with low control oscillations even when used in different lambda value ranges. According to the state of the art, this is viewed as being a primary objective of lambda control methods.

The methods of continuous lambda control developed up to the present have led to a further reduction of toxic material in the exhaust gas of an engine having a catalyzer. The efforts for still further reduction however continue undiminished.

SUMMARY OF THE INVENTION

It is an object of the invention to provide a method for continuous lambda control of an engine having a catalyzer wherein at least in pregiven operating conditions, a control oscillation of open-loop controllable amplitude is generated by coupling in an external signal of controllable amplitude.

This procedure is based on the recognition that for a new catalyzer, the lambda conversion window when increasing the control amplitude becomes larger insofar as a maximum amplitude is not exceeded. The conversion window is that lambda value range wherein the conversion has at least a pregiven quality. The use of lambda probes having a great tolerance is made possible by the increase of the control amplitude. For a greatly aged catalyzer, the control amplitude must however correspond to the conventional or be as small as possible. The control amplitude for the method of the invention is adjustable so that it can be reduced with increasing catalyzer age.

Because of the widened lambda conversion window when carrying out the continuous lambda control with a deliberately increased control oscillation amplitude, it is advantageous to utilize this improvement in many operating conditions. However, the control oscillations for very low loads such as in idle can lead to rough running of the controlled internal combustion engine. However, whether this is the case is dependent upon the dynamic of the particular controlled engine. This means that for an engine type it must be determined on the test stand whether the method can be carried out in all operating conditions and if yes, with which amplitudes of the control oscillation and if not, in which operating conditions there must be a control as conventional.

The continuous control oscillation of pregiven amplitude can be easily realized in that the control manipulated variable can be modulated with a signal of pregiven frequency and an amplitude. In the boundary case, with every intake stroke, the mixture composition can be changed from rich to lean and back fluctuating about the desired mean value. This corresponds to a frequency of 0.5 to 5 Hz compared to the frequency of the control oscillation of approximately 2 Hz as it occurs especially in a two-step control with the frequency being present because of the dead time of the lambda control loop.

In order to carry out the method just described, a separate generation of the modulation signal is required. Simpler but less variable with reference to the modulation frequency is to change the desired value for every zero crossover of the control deviation.

It has been shown that for the control of an internal combustion engine having a new catalyzer, the amplitude of the external signal can be selected to be so large that it leads to considerable rough running of the engine; however, the conversion rate of the catalyzer remains excellent as before. With increasing age of the catalyzer, the conversion rate of the catalyzer deteriorates when maintaining the large control amplitude, so that finally the amplitude of the external signal no longer acts as a limit for the amplitude of the external signal; instead, the requirement of a minimum conversion rate acts as a limit.

According to an advantageous embodiment of the invention, a conversion rate estimate quantity is therefore formed with the aid of the signal from a second probe behind the catalyzer and the control oscillation amplitude is adjusted in dependence upon the particular instantaneous value of this quantity. The amplitude is then increasingly reduced from the amplitude which is at first a maximum for use for new catalyzers and is reduced even more the more the conversion rate estimate value indicates a deterioration of the conversion rate of the catalyzer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
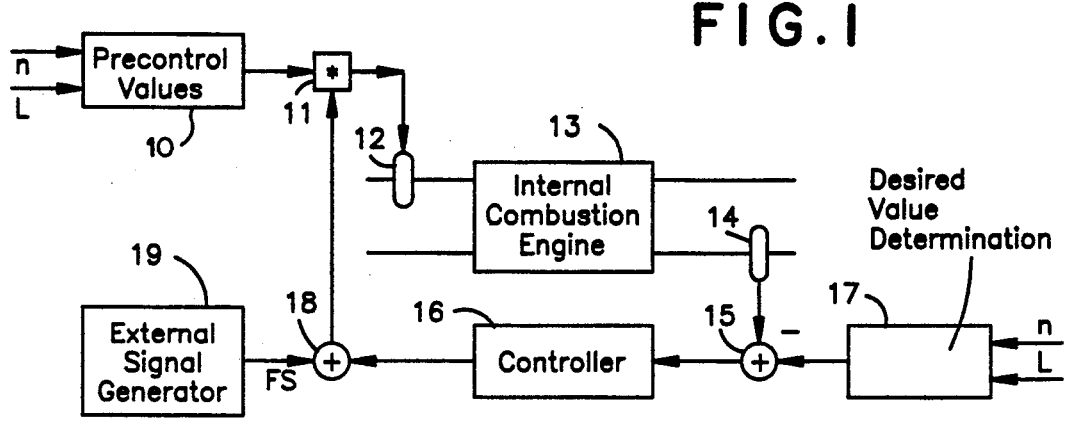
FIG. 1 is a block diagram for explaining an embodiment of a continuous lambda control method according to the invention wherein an external signal is superposed on the control manipulated variable.

The block diagram of FIG. 1 is simplified for clarity and shows a control loop for continuous lambda control with precontrol. Precontrol values for injection times are read out of a precontrol characteristic field 10 addressable via values of engine speed and load and are supplied via a multiplier position 11 to an injection arrangement 12. The air/fuel mixture drawn in by suction is combusted by the internal combustion engine 13. The lambda value of the discharged exhaust gas is measured by a lambda probe 14. The actual value emitted by this probe is subtracted from a desired value at a comparison point 15 with the desired value being supplied from a desired value characteristic field 16 with the desired value being addressable via values of engine speed (n) and load L for a particular operating condition which is then present. The control deviation formed at the comparison point 15 is processed in a controller 16 which supplies a manipulated variable in the form of a multiplication factor to the multiplication position 11 in order to modify the precontrol value supplied to this position 11 from the precontrol characteristic field 10.

A departure from conventional methods is that in the method shown in FIG. 1, the multiplication factor supplied by the controller 16 is not supplied directly as such to the multiplication position 11; instead, an external signal FS is added in the addition position 18 as supplied by an external signal generator 19. The external signal in the embodiment is a signal having a rectangular waveform with a frequency of 0.5 to 5 Hz and an amplitude of 0.05. This means that a control factor supplied by controller 16 is so modified that it fluctuates between an upper value of 1.05 and a lower value of 0.95. This means a fluctuation of the lambda value of 5 % about the mean value 1. The amplitude of the control oscillation of the control factor without external signal amounts in contrast with a continuous control to typically less than $\lambda\% = 1\%$.

Figure 2:
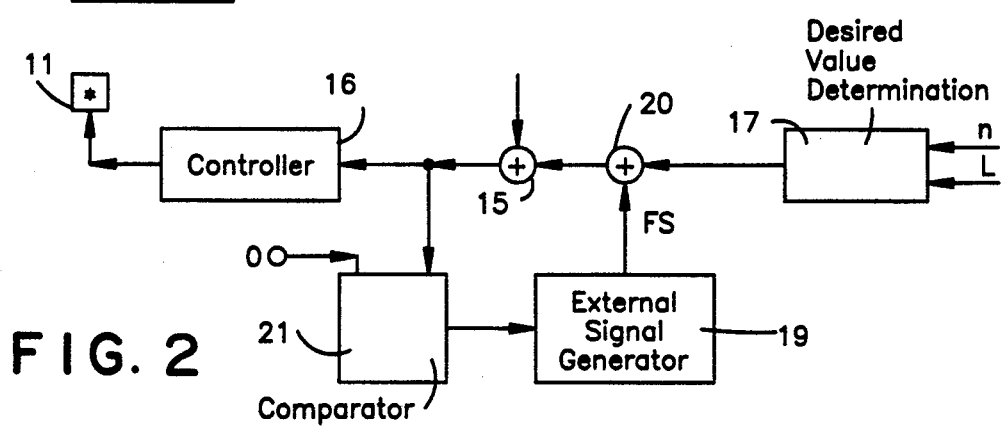
FIG. 2 is a part block diagram of FIG. 1 but with modified desired value quantity range for explaining an embodiment of the method wherein an external signal is superposed upon the desired value; and, FIG. 3 is a block diagram of an arrangement for obtaining a conversion rate estimate value.

In the embodiment shown in FIG. 2, the external signal FS from the external signal generator 19 is not combined with the control factor; instead, the external signal FS is combined with the desired value emitted by the desired value characteristic field 17 with this taking place in a modification position 20. The modified manipulated variable value is then supplied to the comparison position 15 for forming the control deviation. The manipulated variable value is here supplied in lieu of the desired value read directly out of the characteristic field. The external signal generator 19 is controlled by a comparator 21 which always supplies a trigger signal when the sign of the control deviation changes. In order to carry out this function, the control deviation and a comparison signal of the value zero are supplied to the comparator 21. The external signal generator 19 supplies signals with alternating signs with the sign being selected such that it increases the value of the control deviation.

Instead of reading out a single desired value for a particular operating condition and to change the same with the aid of an external signal, it is also possible to store two desired values for each operating condition and to read out one of the two values in dependence upon the direction of the zero crossover of the control deviation from the characteristic field. However, with this procedure, the adaptation to the catalyzer age is made more difficult.

Figure 3:
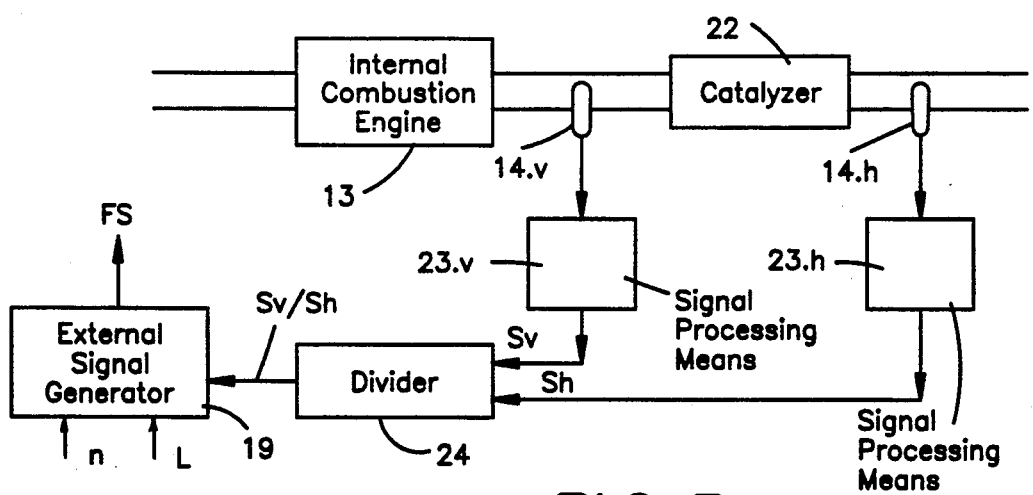

In the method sequence shown in FIGS. 1 and 2, the external signal generator 19 continuously supplies a signal of the same amplitude. However, it is more advantageous to adjust the amplitude in dependence upon operating conditions of the controlled internal combustion engine 13 and in dependence upon the conversion capability of a catalyzer. FIG. 3 will now explain how this can be realized.

In the arrangement of FIG. 3, two lambda probes are provided and a forward lambda probe 14.v is arranged ahead of the catalyzer 22 and a rear lambda probe 14.h is arranged behind the catalyzer. The signals emitted by these lambda probes are processed respectively by a front processing means 23.v and a rear processing means 23.h. The processing means supply signals Sv and Sh, respectively, to a divider 24 which forms the ratio Sh/Sv and supplies this ratio to an external signal generator 19. The external signal generator 19 determines the amplitude of the external signal FS in dependence upon the value of the ratio and furthermore in dependence upon the values of engine speed (n) and load L. It has also been shown that for most internal combustion engines because of their dynamic, it is necessary to drive the amplitude to the value zero during idle.

In the signal processing means 23.v and 23.h, the amplitude of respective signals of the lambda probes 14.v and 14.h can be scanned and held or, the mean value of the voltages emitted by the probes can be formed preferably after conversion into lambda values. It has been shown that the ratio Sh/Sv is a relatively good measure for estimating the conversion rate of a catalyzer. With a new catalyzer, the lambda value behind the catalyzer remains constant even for oscillations of only several percent of the value ahead of the catalyzer. The mentioned ratio then has a relatively small value. For a completely unusable catalyzer, the probes ahead and to the rear of the catalyzer show each approximately the same values so that the ratio climbs to the value one. The ratio moves between the two limit cases with increasing age. On a test stand, it can be relatively easily determined how the amplitude of the external signal can be reduced if the ratio value indicates that the conversion rate of the catalyzer is deteriorating. In a practical application, the external signal generator fixes a maximum amplitude for each operating point (the operating point being fixed by values of engine speed (n) and load L) and these values are reduced in dependence upon the instantaneous value of the conversion rate estimate quantity. The reduction value is read out from a characteristic memory which is addressed with the aid of instantaneous values of the estimate quantity.

The measure described above with the conversion rate estimate quantity is utilized since probes according to the state of the art for directly determining the conversion rate are too complicated and too expensive. As soon as such probes are economically available, it would be advantageous to provide such a toxic gas probe forward and rearward of the catalyzer and to determine the conversion rate directly from the ratio of the probe signals and to reduce the artificially increased control oscillation amplitude with deteriorating conversion rate.

It is understood that the foregoing description is that of the preferred embodiments of the invention and that various changes and modifications may be made thereto without departing from the spirit and scope of the invention as defined in the appended claims.

What is claimed is:

1. A method for continuous lambda control of an internal combustion engine having a catalyzer, the method comprising the steps of:

generating a control oscillation with controllable amplitude in at least pregiven operating conditions;

adjusting the control oscillation amplitude in dependence upon a conversion rate estimate value for the catalyzer; and, the adjustment of said amplitude starting first from the maximum amplitude when using a new catalyzer and then to a lesser value the more the conversion rate estimate quantity indicates a deterioration of the conversion rate of the catalyzer.

2. The method of claim 1, wherein the control oscillation of controllable amplitude is generated by coupling an external signal of controllable amplitude into the control loop.

3. The method of claim 1, wherein the control oscillation of controllable amplitude is generated by adjusting the desired value for each servo crossover of the control deviation.

4. The method of claim 1, wherein the method is carried out in all operating conditions except for carrying low load.

* * * * *

UNITED STATES PATENT AND TRADEMARK OFFICE
CERTIFICATE OF CORRECTION

PATENT NO. : 5,209,060
DATED : May 11, 1993
INVENTOR(S) : Klaus Hirschmann, et. al.

It is certified that error appears in the above-indentified patent and that said Letters Patent is hereby corrected as shown below:

In Column 6, line 10, delte "servo" and substitute --zero-- therefor.

Signed and Sealed this

Twenty-second Day of February, 1994

Attest:

BRUCE LEHMAN

*Attesting Officer*      *Commissioner of Patents and Trademarks*